United States Patent [19]

Johnson

[11] 4,074,869
[45] Feb. 21, 1978

[54] MACHINE FOR SHREDDING LEAVES AND GARDEN DEBRIS

[76] Inventor: Walter G. Johnson, 39 Pitt Road, Boonton, N.J. 07005

[21] Appl. No.: 776,648

[22] Filed: Mar. 11, 1977

[51] Int. Cl.² .................................. B02C 18/24
[52] U.S. Cl. .................................. 241/55; 15/339; 56/13.1; 74/52; 74/674; 241/101.7; 241/163; 241/188 R
[58] Field of Search ............ 241/55, 56, 101.1, 101.2, 241/101.7, 162, 163, 188 R; 15/328, 339; 56/13.1; 74/52, 805, 674

[56] References Cited

U.S. PATENT DOCUMENTS

| | | | |
|---|---|---|---|
| 1,137,334 | 4/1915 | Kranich | 241/56 |
| 2,590,734 | 3/1952 | Strong | 241/101.7 X |
| 2,677,223 | 5/1954 | Schwarz | 241/101.7 X |
| 2,761,332 | 9/1956 | Gray et al. | 74/674 |
| 3,011,304 | 12/1961 | Sundt | 74/805 X |
| 3,968,938 | 7/1976 | Ruhl et al. | 241/101.7 X |

Primary Examiner—Roy Lake
Assistant Examiner—Howard N. Goldberg
Attorney, Agent, or Firm—Martha G. Pugh

[57] ABSTRACT

A vacuum blower-type mobile unit for shredding leaves and other garden debris. The unit comprises a pair of coaxially disposed rotors operated at respectively different speeds, the blades of the two rotors being separated by a minimum practical axial clearance to provide shredding action. Shredding is further enhanced by stationary radial blades fixed to the casing adjacent the input to the slow speed rotor, and a circular plate formed to include a large number of exit guide vanes including fixed blades disposed adjacent the output from the high speed rotor. The speed differential between the rotors and the shapes of the blades cooperate to create between them a high velocity axial stream of air and debris which moves smoothly through the machine, depositing the product in comminuted form in a bag or other container.

8 Claims, 10 Drawing Figures

MACHINE FOR SHREDDING LEAVES AND GARDEN DEBRIS

BACKGROUND OF THE INVENTION

This relates in general to devices for gathering and shredding lawn debris, more particularly, leaves.

Many prior art shredders are of a centrifugal flow type and are, in many cases, designed so that the debris flows through the machine at a relatively slow rate. Furthermore, in many types of prior art leaf shredders, leaves and other debris tend to be trapped in the housing. These design defects cause the shredders to unnecessarily consume power and to operate in a manner which is inefficient and wasteful of energy.

SUMMARY OF THE INVENTION

Accordingly, the principal object of the present invention is to provide a leaf shredder of improved design which operates more efficiently and with less fuel than prior art devices for the gathering and shredding of lawn debris. More particular objects of the invention are to provide a shredder in which the rate of flow of debris through the machine is substantially increased and made smoother as compared to prior art shredding devices. Another object of the invention is to provide an air flow machine having an efficiency which approaches the theoretical air horsepower. Another object of the present invention is to provide shredding action which produces a readily compacted pulp.

These and other objects are realized in accordance with the present invention in a debris shredding device comprising an axial flow blower mounted on a mobile unit. The shredding device comprises a pair of rotors, each with a plurality of blades, which are coaxially mounted in a housing and driven to rotate at substantially different rates, thereby generating a pressure differential between the inlet where the debris is picked up and the outlet where the comminuted material is deposited. In the preferred embodiment under description, a high speed rotor, having five blades, is fastened to the main shaft; and a low speed rotor, having six blades, is mounted on a short, tubular shaft which is supported in a pair of bearings journalled on the main shaft, and which is driven to rotate at approximately one-fifth the angular velocity of the main shaft. The blades on both the low speed and high speed rotors are specially shaped, with the leading and trailing edges of the respective blades in planes normal to the main shaft, thereby to generate an axial air flow which creates a substantial pressure differential between inlet and outlet. Contributing to the shredding action, the placement of the low speed rotor relative to the high speed rotor is such that the planes of the trailing edges of the former and the leading edges of the latter are separated by the minimum practical clearance.

A second means for promoting shredding action comprises a set of four stationary radial blades fixed internally to the casing adjacent the input to the low speed rotor. These stationary blades are disposed to provide a minimum practical clearance from the leading edges of the low speed rotor blades.

A third means for promoting shredding action comprises a circular plate, mounted in fixed relation to the casing, concentric with and adjacent the output end of the high speed rotor. This plate is pierced with a plurality of openings, each supporting a fixed blade, having a leading edge set at a minimum practical clearance from the trailing edges of the high speed rotor blade.

A particular feature of the present invention is the concentric pair of rotors having a minimum practical clearance between their blades, and operating at different speeds so that they form a highly efficient vacuum blower which generates an axial stream of air and debris which moves through the machine smoothly, with minimum restriction. The stationary blades adjacent the input and output ends enhance the cutting operation.

The shredding device of the present invention has several advantages over prior art shredding devices. For a given size and power it provides a greater flow rate through the machine than machines of a centrifugal type. The passage through the machine is substantially unrestricted, so that leaves and other debris are not trapped in the housing to consume power unnecessarily. The machine under description requires less power to operate than a centrifugal machine, inasmuch as the designed operation approaches the theoretical air horsepower. The machine of the present invention can process more debris per unit time than prior art shredders presently in use. It functions to shred the input debris to a fine pulp, which is readily compacted to a relatively small volume.

These and other objects, features and advantages will be apparent from a study of the specification hereinafter with reference to the attached drawings.

DETAILED DESCRIPTION

Figures 1, 10:
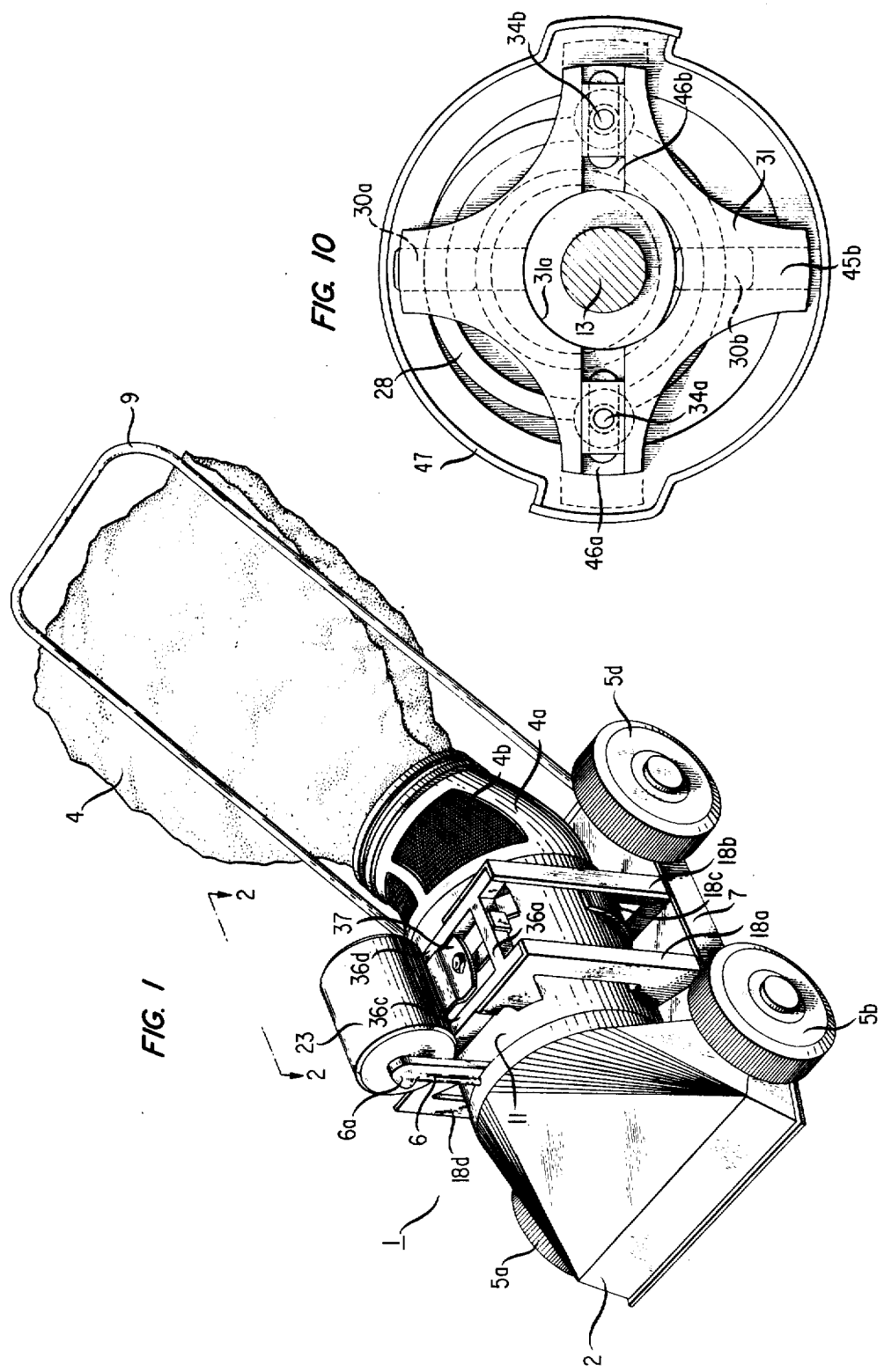
FIG. 1 is an overall perspective showing of a leaf shredder in accordance with the present invention, enclosed in a cylindrical case mounted on a mobile carriage.
FIG. 10 is an elevational showing of the planocentric restraining yoke for reducing the rotational speed of the low speed rotor.

Referring now to the detailed description of the drawings, FIG. 1 is an overall perspective showing of the leaf and garden debris shredder 1 of the present invention.

The device is mounted for mobility on a conventional carriage 7 of, for example, cast aluminum or steel weldment, which has an overall length of, say, 20 inches and which is about 14 inches wide. The front wheels 5a and 5b are respectively mounted for independent rotation on a pair of brackets which extend out angularly from the front end of the carriage. The rear wheels 5d are mounted at opposite ends of a conventional motor driven axle.

The main frame, which is a separate integral assembly, comprises front and rear end frame units, each of which is made up of a pair of left-hand and a pair of right-hand vertically supporting members 18a,18d and 18b,18e, respectively, which may, for example, be of pressed sheet steel. Each of the pairs of end frame members 18a,18d and 18b,18e is held together at the top by a hollow steel member of square box section, 36c and 36d, respectively, and at the bottom by a steel channel member, 18f and 18g, respectively (see FIG. 2). The end frame units comprising members 18a,18d and 18b,18e may be 15 inches high, 13½ inches across the top, and 1¼ inches deep.

The end frame units, including top supporting members 36c and 36d, are bolted together at opposite ends by a pair of hollow steel lateral members 36a,36b, also of square box section. The latter are also bolted to the cylindrical casing 11, and are respectively welded to support plates 44a,44b (see FIG. 2), which are bolted to the end frame units.

The vertically supporting members 18a,18d and 18b,18e are cut out and shaped internally to form a cradle 18c for the cylindrical casing 11 which is bolted to the frame as previously described. The cylindrical motor housing 23 is mounted on the adjustable motor mount 37, which is supported by lateral frame members 36a,36b and the end frame members 18a,18d and 18b,18e.

The motor mount 37 is substantially centered above a cylindrical casing 11 of, say, formed sheet steel or other rigid metal, which in the present illustrative example is 10½ inches in inner diameter, 12¼ inches along its axis and has a wall thickness of 1/16 inch, and which is bolted or otherwise secured inside of the cradle formed by the supporting frame described in the foregoing paragraph. A hollow vertically disposed pulley housing 6, adjacent the front of support 18a,18b, is 3¼ inches in diameter and 13¾ inches from top to bottom and has a pair of outwardly bulging cavities 6a,6b for accommodating the ends of shafts 10 and 13. Housing 6 accommodates the end of the motor shaft 10 and the associated power transmitting cogged pulley system for driving the shredding machine, as will be explained hereinafter. (See FIG. 2)

If desired, the motor of housing 23 may also be mechanically coupled to the rear axle to drive the carriage by conventional means. A conventional handle 9 is bolted to one end of the carriage 7 to enable the latter to be pushed or guided manually. At the rear end of the carriage, adjacent the handle, is fastened a conventional bag 4 for collecting comminuted leaves and other debris shredded by the machine. This may be of canvas, plastic or any suitable material. The open end of the bag is removably fastened to the neck of a conventional hollow cylindrical connector 4a, the axis of which is bent up from the horizontal at an angle of, say, 15°, to keep the inflated bag from falling on the ground. The other end of the neck member 4a is bolted or otherwise secured to one of the open ends of the cylindrical casing 11. Several areas of screening 4b are interposed on the surface of neck 4a to permit the escape of excess air passing through the machine.

Interposed between the wheels 5a and 5b, adjacent the front end of carriage 7, is a removable sheet metal guard member 2 of conventional form. This is substantially rectangular at its lower end, with a rectangular kickplate across the front, say, 15½ inches long by 2 inches high, the lower end of which is about one inch above the ground and the upper end being tipped inwardly at a slight angle to the vertical. The upper portion of guard 2 is substantially frustroconical in form, being connected to a circular fitting which is bolted or otherwise secured to one of the open ends of casing 11.

The bottom of guard 2 provides a rectangular opening about 6½ inches wide and 15½ inches long, the forward edge being tipped up so that the lateral edge forms an angle of 20° with the ground. The rear wall of guard 2 is curved inwardly to direct the vacuum sucked leaves and other debris into the circular opening of the cylindrical casing 11.

Figure 2:
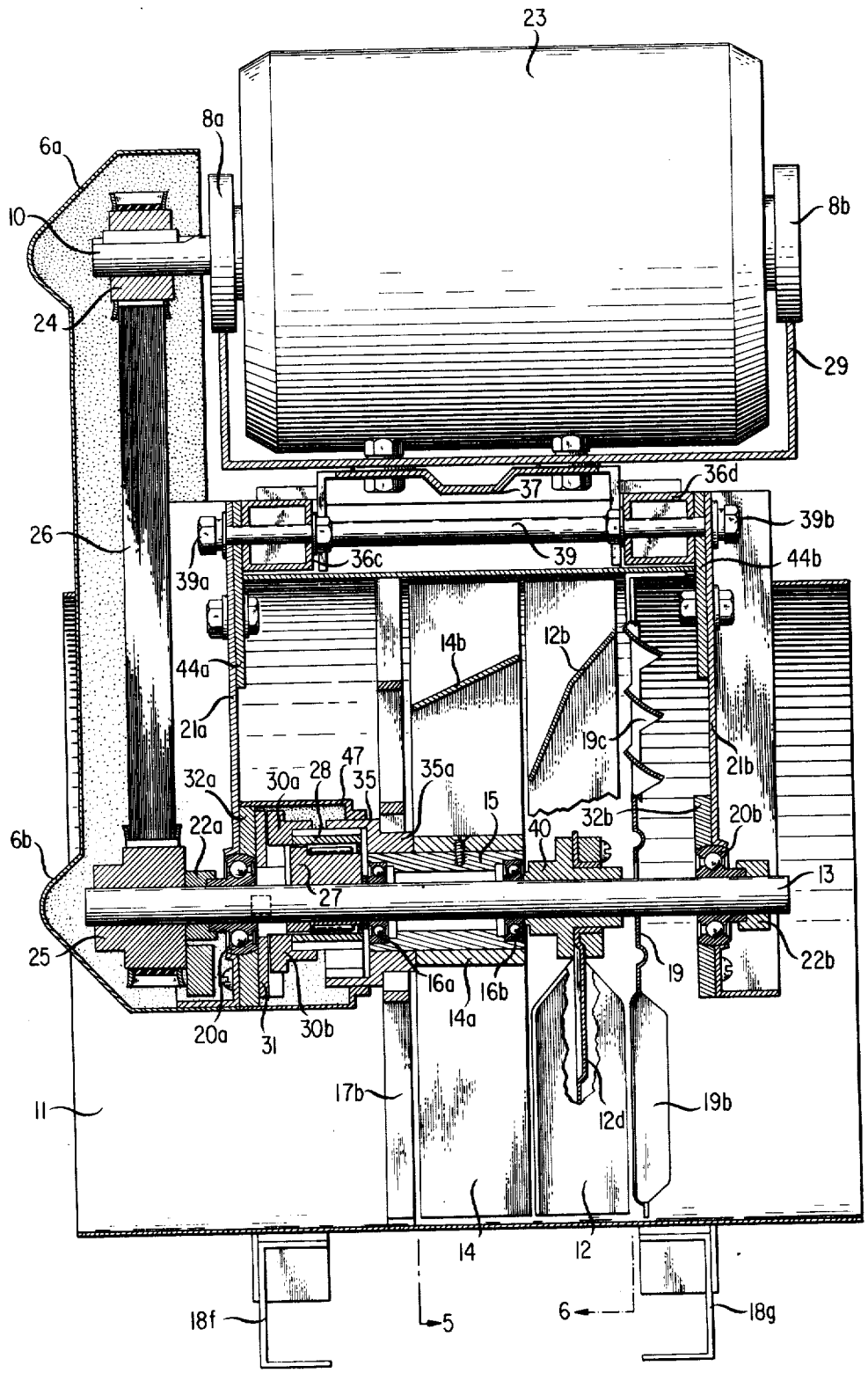
FIG. 2 is a longitudinal section, taken along the plane indicated by the arrows 2—2 of FIG. 1, of the shredder removed from the carriage.

Let us refer now to FIG. 2, which shows a longitudinal section of the shredding device of FIG. 1 which has been lifted off of the carriage 7, the guard 2 and collecting means 4a having been removed for convenience of description.

Figure 3:
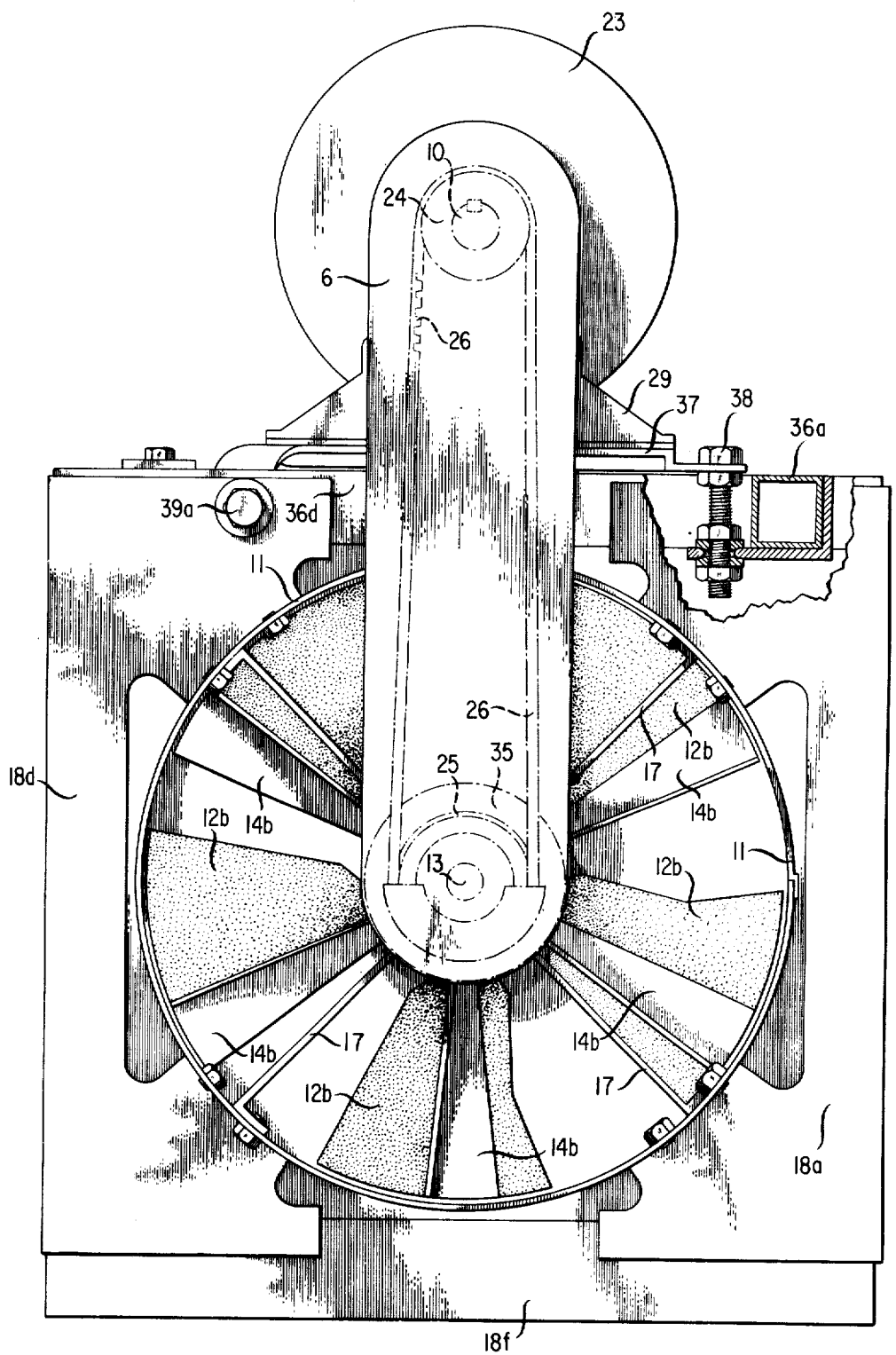
FIG. 3 is a front elevational showing of the leaf shredder of FIG. 1 with the guard removed, showing the slow moving set of cutting blades.
Figure 7:
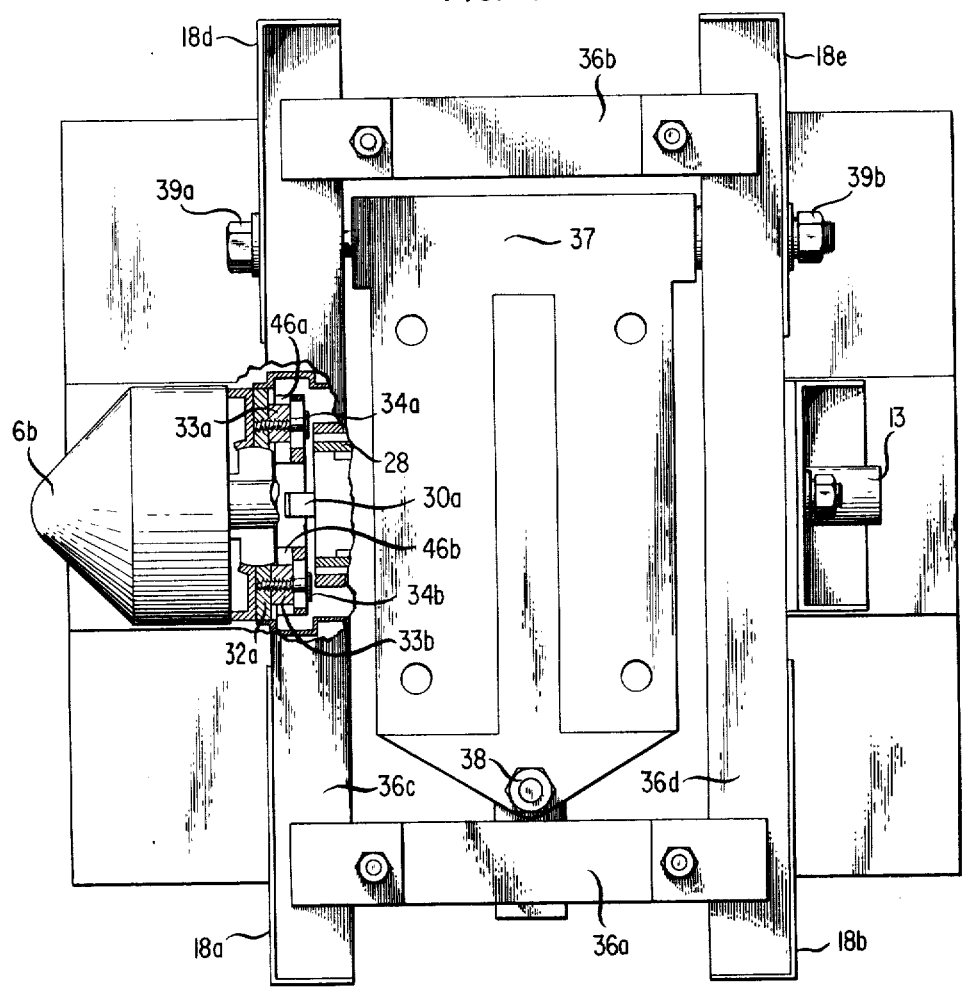
FIG. 7 is a view looking down on the top of the leaf shredder as shown in section in FIG. 2, with the motor removed.

The cylindrical casing contains a conventional motor 23, having a shaft 10 passing axially through isolators 8a,8b near its two ends. The motor 23, including the isolators 8a,8b, is mounted and fastened to the cradle 29, which is bolted to motor mount 37. The latter is supported by the long bolt 39 having terminal nuts 39a,39b, between supporting frame members 18a,18b, and by an adjusting screw and nut assembly 38 to the center of lateral support member 36b, as shown in FIGS. 3 and 7. In the present illustrative embodiment, this motor is designed to generate one horsepower, imparting to the motor shaft 10 a rotational speed of 3450 revolutions per minute. The design criteria for the preferred form of motor for the present embodiment will be set forth in greater detail hereinafter.

The motor shaft 10, which is steel, ⅝ inch in diameter and extends 1⅛ inches in the present embodiment, terminates at the front end in a conventional type of cogged pulley 24, which is coupled by means of the toothed belt 26 to cogged pulley 25, aligned below, the latter being fixed to the front end of the main drive shaft 13. The details of the cogged pulley system for a preferred system will be set forth with greater specificity hereinafter.

In the model under description, the main shaft 13 is mounted in a conventional pair of self-aligning bearings 20a,20b, spaced 7⅝ inches apart in an axial direction, the outer races of which are respectively mounted near the bases of a pair of vertically mounted brackets 21a,21b. The latter are bolted at their upper ends to frame members 36c,36d through the respective supporting plates 44a and 44b which are respectively welded to the lateral frame members 36a,36b, as previously described. The outer races of bearings 20a and 20b are clamped to vertically mounted brackets 21a and 21b by bolts through supporting plates 32a,32b. Bearings 20a and 20b are respectively held in place near the forward and rear ends of the shaft 13 by a pair of annular collars 22a and 22b. The former abuts the housing of the cogged pulley 25, with which it is coaxially aligned.

Figure 4:
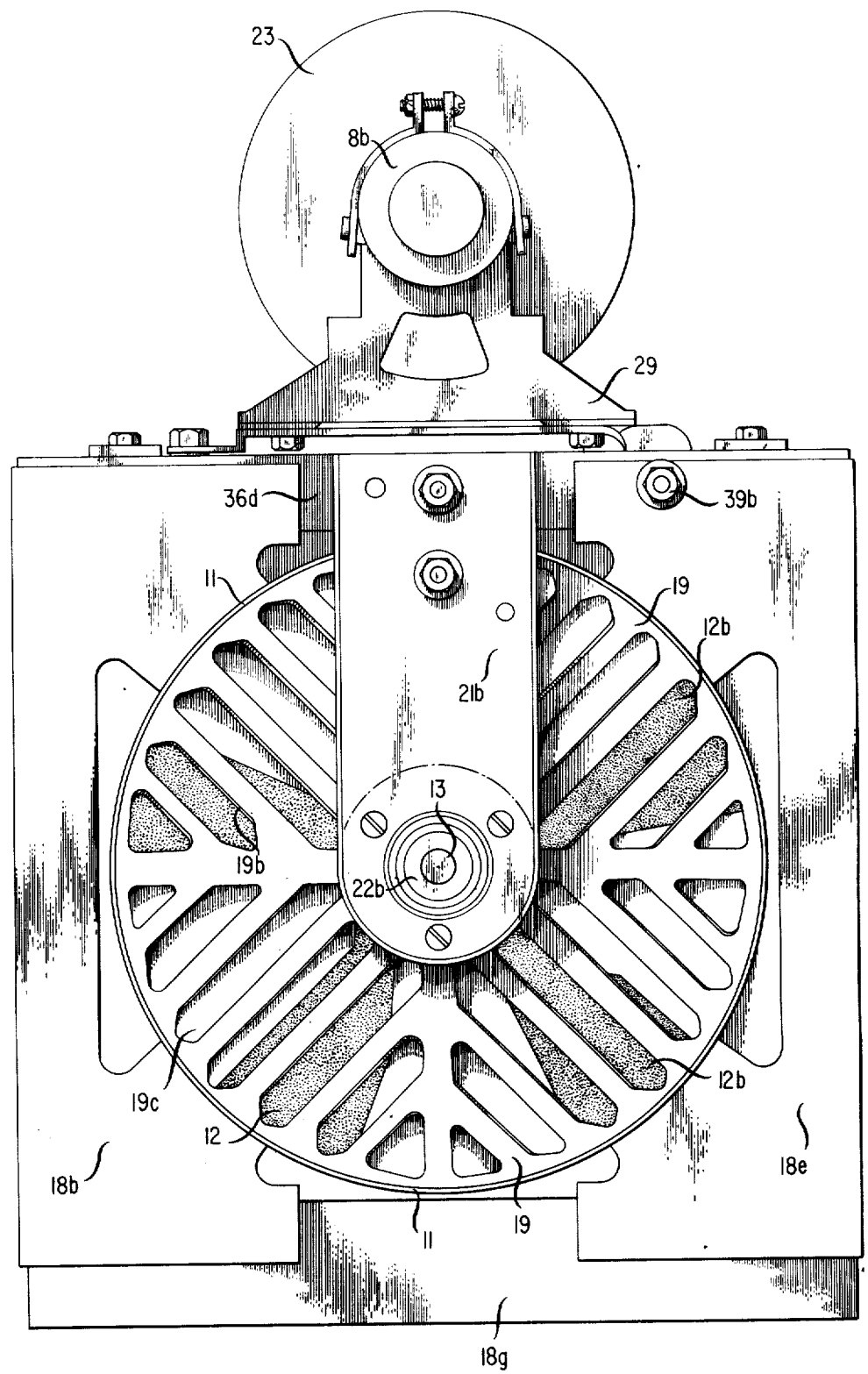
FIG. 4 is a rear elevational showing of the leaf shredder of FIG. 1, with the collecting bag removed, showing the perforated stationary plate, including cutting blades.
Figure 9:
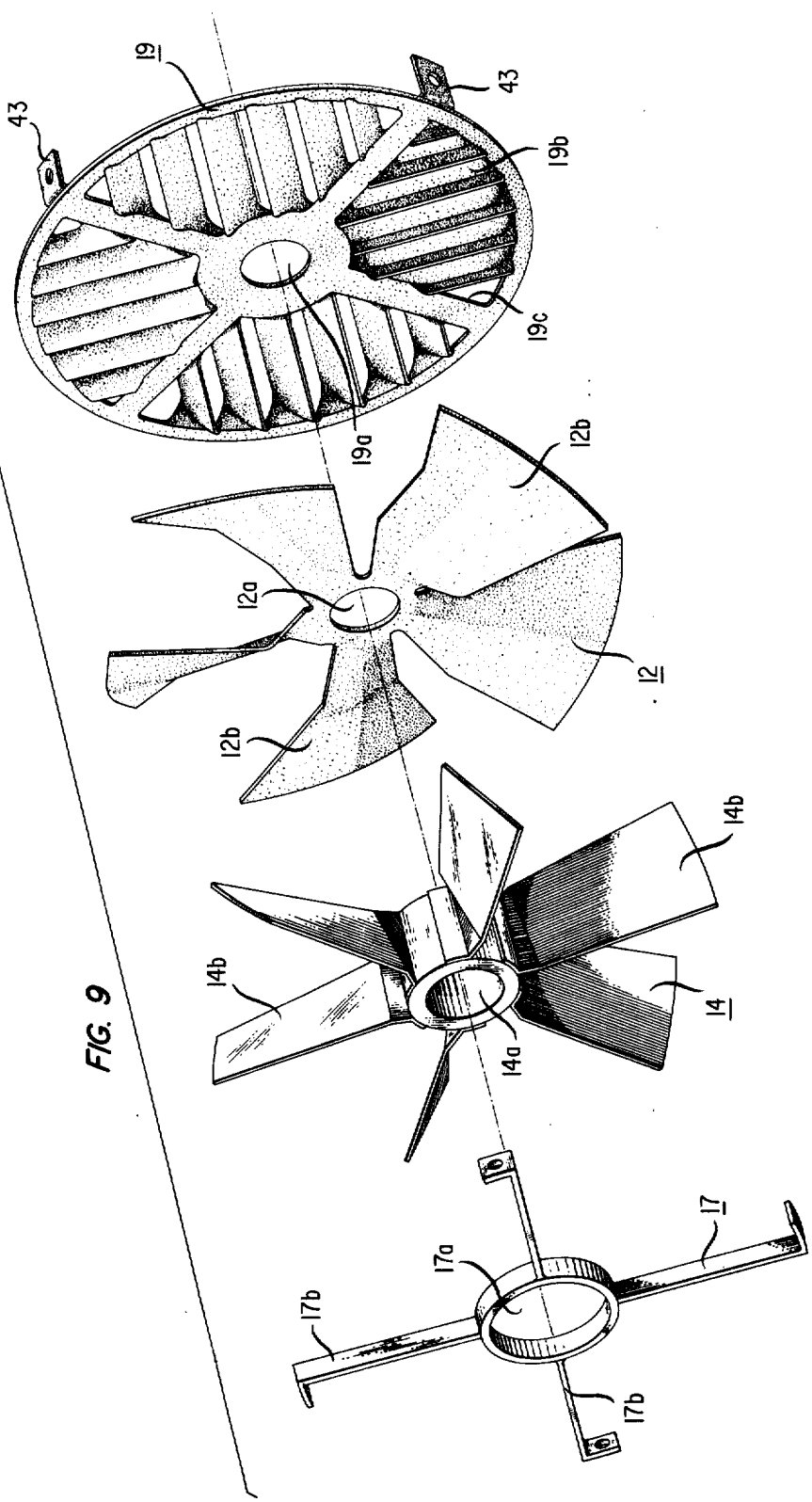
FIG. 9 is an isometric showing in exploded view of the axially disposed cutting elements of the leaf shredder of FIG. 1, including the stationary inlet vanes, the slow and fast rotatable cutting blades and the stationary exit vanes.

Centered near the rear end of the main drive shaft 13, about 1¼ inches forward of the center of self-aligning bearing 20b, is a circular, nonrotatable output plate 19, which in the present embodiment is 10½ inches in diameter. This is secured by symmetrically placed right angle brackets 43 to the inner surface of cylindrical casing 11. Plate 19 is shown more clearly in FIGS. 4 and 9. It is concentric with and fixed with relation to rotation of the shaft 13, which passes through a circular opening 19a at the center of plate 19, which opening is of sufficiently large diameter to prevent frictional contact with the shaft.

In the present embodiment, as shown, the plate 19 is pierced with a large number of elongated openings 19c, arranged in a pattern which is symmetrical about the X and Y axes. The openings 19c, which are 28 in number in the present illustration, and each of which is, say, ⅜ inch wide, are formed along lines making a 45° angle with the X and Y axes. In each quadrant, they extend from near the internal boundaries of the quadrant almost to the periphery of the plate, varying in length in accordance with their positions in the respective quadrant.

Figure 6:
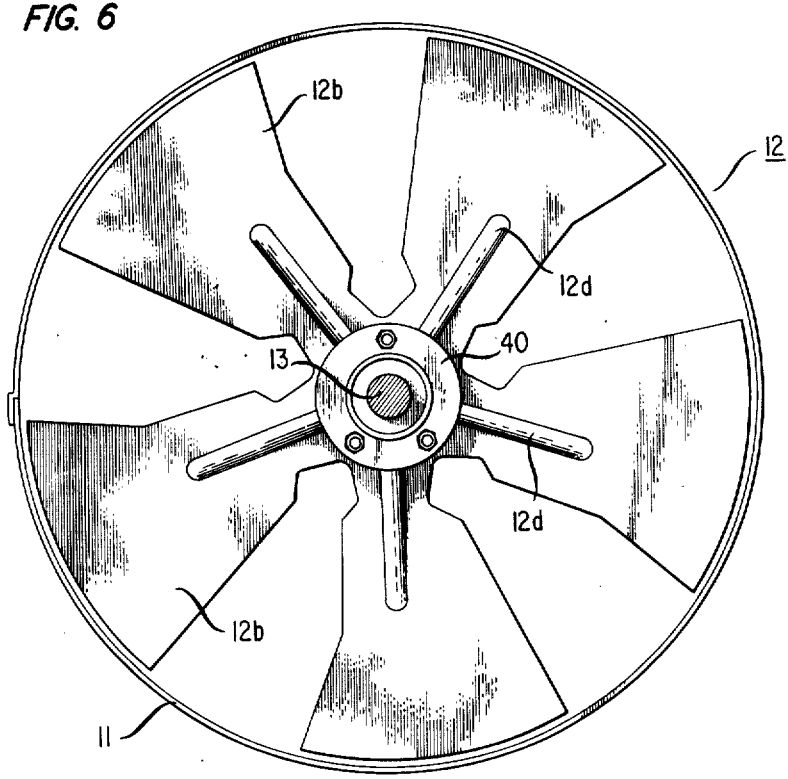
FIG. 6, whose position is indicated by the partial section line 6 of FIG. 2, is a rear elevational view of the fast moving set of cutting blades of the leaf shredder of FIG. 1.

As shown in section in FIG. 2, each of the openings 19c is formed to include a knife 19b along one of its long edges, each of which is skewed inwardly so that the leading edge forms an angle of, say, 45° with the principal axis of shaft 13. The lateral extent of the blades in the direction of shaft 13 is ⅝ inch in the present embodiment; and the blades are shaped to redirect any tangential component of air flow to primarily axial flow. The plate 19 is fixed to casing 11 so that the leading edge of each of the 24 blades 19b is set at a minimum practical clearance (1/16 inch in the present embodiment) from the plane of the trailing edges of the blades 12 of the high speed rotor 12, which will now be described. (See, FIGS. 6 and 9).

About one inch in from the stationary screen 19 is centered the high speed rotor 12, which is 10¼ inches in outer diameter. Rotor 12 is fixed to shaft 13 through a one inch diameter central opening 12a, by means of hub 40, so that rotor 12 rotates at the shaft speed, which in the present illustrative embodiment is 2540 revolutions per minute. In this embodiment, the high speed rotor 12 is equipped with five blades 12b, symmetrically disposed about the central axis. The shapes of each of these blades is shown in detail in FIG. 6, and in exploded view in FIG. 9. Extending out 2⅜ inches radially from the hub 40 are five stiffening metal ribs 12d, one of which is longitudinally centered on the back face of each of blades 12b. The function of the blades 12b is to generate an axial air flow and to generate a pressure differential between the inlet and outlet of the shredding machine. Both the leading and trailing edges of blades 12b are designed to lie in planes that are normal to the axis of main shaft 13. The trailing edges of the blades 12b, which extend 1½ inches in the axial direction, are disposed at a minimum axial clearance from the plane of the leading edges of fixed blades 19b of the screen 19, which in the present embodiment is 1/16 inch.

Figure 5:
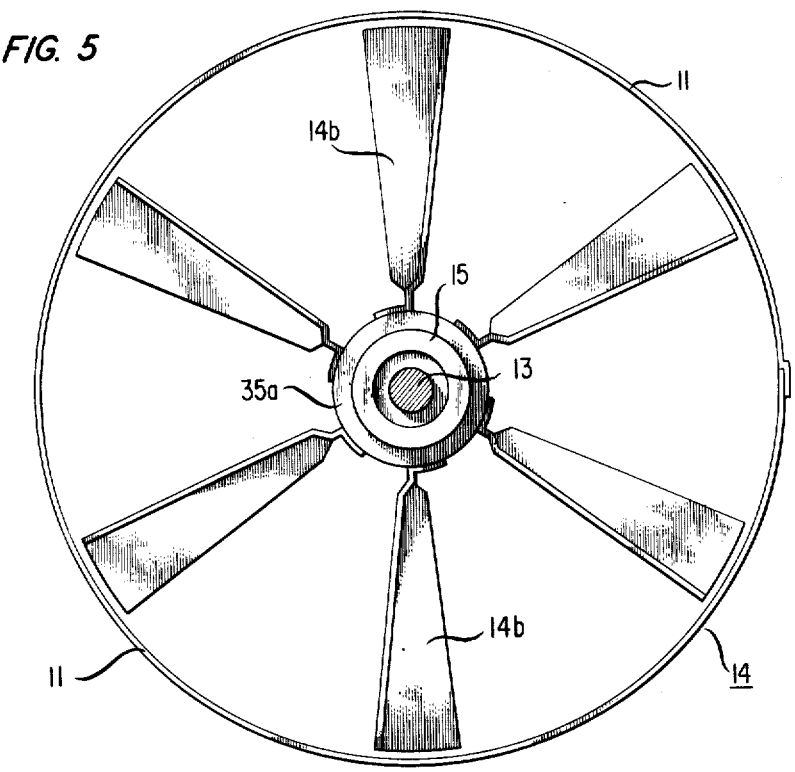
FIG. 5, whose position is indicated by the partial section line 5 of FIG. 2, is a front elevational view of the slow moving set of cutting blades of the leaf shredder of FIG. 1 et seq.

The low speed rotor 14, which is centered one inch in an axial direction from the leading edges of the blades of high speed rotor 12, is 10¼ inches in outer diameter. (See, FIGS. 5 and 9.) In the present embodiment, it has six blades 14b, each having a radial length of, say, 4¼ inches and width in an axial direction of 1⅜ inches. The ends of the blades 14b are mounted symmetrically around and welded to the outer cylindrical surface of a cylindrical hub 14a, which in the present embodiment is 1⅝ inches in inner diameter, 2¼ inches in outer diameter and 1⅜ inches long. Hub 14a is fixed to tubular shaft 15. Tubular shaft 15, in its present embodiment, is one inch in inner diameter, 1⅝ inches in outer diameter and 2½ inches long. The tubular shaft 15 is supported at its two ends on the outer races of a pair of ball bearing assemblies 16a, 16b, which are journalled on the main shaft 13. The forward end of shaft 15 is bolted or otherwise secured to the cylindrical internal surface of the rear collar 35a of ring gear 35, the collar being 1⅝ inches in inner diameter and 2¼ inches in outer diameter and extending ½ inch in an axial direction to an annular shoulder, at which the outer diameter of collar 35a is stepped up to an outer diameter of 2 11/16 inches of ring gear 35.

In the radial space above and below the collar 35a is disposed a set 17 of radial stationary blades 17b which extend out from a central collar or hub 17a having an inner diameter of 2 13/16 inches and an outer diameter of 3 3/16 inches. (See, FIG. 9.) In the present embodiment, blades 17b are four in number, 3⅜ inches in a radial direction and 7/16 inches wide, and are symmetrically disposed around and welded to the collar 17a. They are bolted or otherwise rigidly secured at their outer ends to the inner surface of casing 11 by a rectangular tab on each blade. The knife edges of stationary blades 17b are disposed a minimum practical distance from the leading edges of the blades 14b of low speed rotor 14, which in the present embodiment is 1/16 inch.

Figure 8:
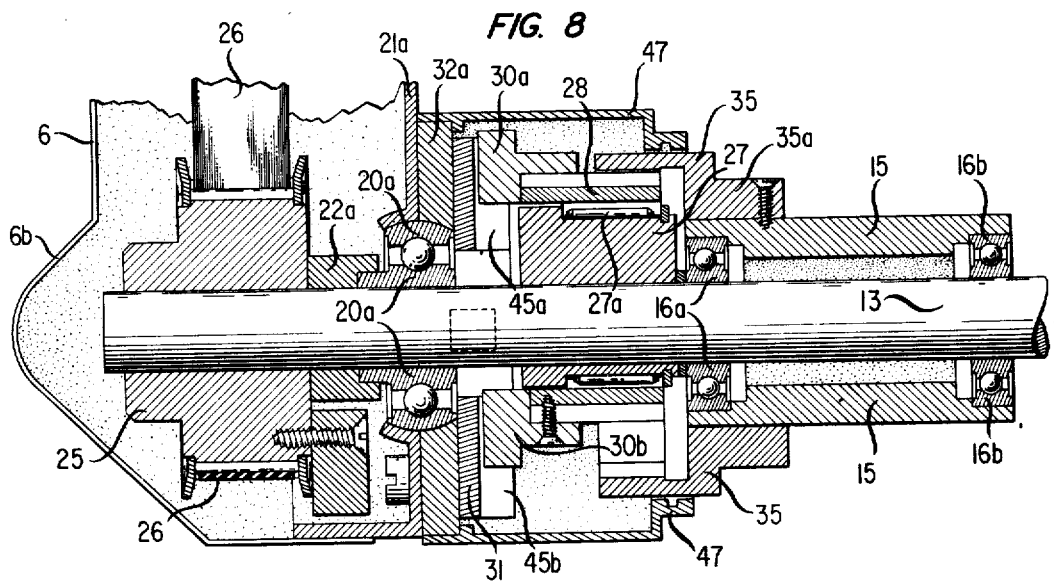
FIG. 8 is an enlargement of a portion of the longitudinal section of FIG. 2, showing the location of the central drive shaft, auxiliary drive shaft and cutting blades in relation to the planocentric restraining yoke.

Referring for detail to FIG. 8, the structure of the gear reducing mechanism, including the planocentric reducer shown in FIG. 10, will now be described. All of these reducing gear parts are contained within the inner casing 47. The forward portion of ring gear 35, which is 2 11/16 inches in outer diameter and 2⅛ inches in inner diameter, has 46 teeth around its inner perimeter.

An eccentric member 27, which is journalled on shaft 13, is secured to rotate with shaft 13 inside of ring gear 35. Eccentric 27 has a journal diameter of 1¼ inches, a shoulder diameter of 1 7/16 inches, is 1 3/16 inches wide in an axial direction and is centered about an axis parallel to and about ¼ inch above the axis of shaft 13. An annular roller bearing 27a is journalled on the 1¼-inch diameter surface of eccentric 27 and secured in the 1¼-inch inner diameter of annular pinion gear 28.

Annular pinion gear 28, having an overall outer diameter of 1 13/16 inches, an inner diameter of 1¼ inches, an axial length of ¾ inch and carrying 37 teeth around its outer periphery, is designed to mesh with the internal teeth of ring gear 35. The pinion 28 is held so that it moves around the inside of ring gear 35 without rotation, by being secured at its forward end in fixed abutting relationship to the upper and lower projecting rectangular members 30a and 30b, which are ¼ inch in an axial direction, ½ inch high and 5/16 inch deep. The projections 30a, 30b are designed to move up and down in the vertical slots 45a, 45b in the vertical arms of spider 31, as pinion 28 moves around the inner teeth of ring gear 35 (See, FIG. 10.) At the same time, spider 31 is free to move back and forth laterally as blocks 33a, 33b, which are secured by screws 34a, 34b, slide in horizontal slots 46a and 46b. The four symmetrically spaced legs of spider 31 are 7/16 inch thick in an axial direction, about 1¼ inches across the base portions and 11/16 inch across the top. The central opening 31a of the spider is concentric with the shaft 13 and is 1 3/16 inches in diameter.

DESIGN SPECIFICATIONS FOR PREFERRED EMBODIMENT

A. Axial Flow Machine (as shown in detail in FIG. 2 et seq.) has the following design characteristics:

Theoretical Mass Air Flow Q = 1160 ft$^3$/min.

Theoretical Air Velocity (axial) = $V_A$ = 35ft/sec.

The high speed blades 12b are designed for a pressure head of two inches of water (0.072 pounds per square inch).

Theoretical Air Horsepower = 0.364.

The high speed rotor 12 is designed to rotate at 2540 rpm (the speed of rotation of main shaft 13).

High speed rotor 12 has five blades 12b, and a tangential velocity component at the blade tip = $U_t$ = 116 ft/sec. = 6960 ft/min.

Low speed rotor 14 is geared down through gear reducing mechanism to rotate at 500 rpm (less than one-fifth the rotational speed of high speed rotor).

Low speed rotor 14 has six blades 14b, and a tangential velocity component at the blade tip = $U_t$ = 23 ft/sec. = 1380 ft/min.

B. Timing Belt Drive:

Pulleys 24 and 25 are conventional timing belt pulleys, having 14 teeth and 19 teeth respectively, for a ⅜ inch wide, ⅜ inch pitch belt. The belt 26 has 270 teeth and a 10.4-inch center distance with pulleys 24 and 25.

The gear ratio between pulleys 24 and 25 is 1.36.

The estimated horsepower capacity for a 3450 rpm motor = 1.7.

C. Reducer for Low Speed Rotor 14:

The planocentric type reducer includes eccentric 27 on main shaft 13, and has an eccentricity of 0.225 inch. Pinion gear 28 is restrained from rotating, but does traverse the teeth of ring gear 35 in a planetary motion. Thus, pinion gear 28 drives ring gear 35.

Ring gear 35 has teeth $N_G$ = 46.

Pinion gear 28 has teeth $N_p$ = 37.

Gear ratio $K = \frac{\text{angular velocity (High)}}{\text{angular velocity (Low)}} = \frac{W_H}{W_L} = \frac{N_G}{N_G - N_P} = 5.1.$ Pinion gear 28 takes the form of a 20 diametral pitch straight spur gear.

Maximum power input to main shaft = 1 horsepower at 2450 rpm (25 inch pounds of torque).

Maximum power output to tubular shaft 15 = 500 rpm (127 inch pounds of torque).

D. Motor (in casing 23):

Power = 1 horsepower.

Angular velocity of motor shaft = 2450 rpm.

Characteristics of motor: Designed for 115 volts, 60 hz., single phase; starting torque and locked rotor torque should not exceed 200 percent full load torque.

Motor in preferred embodiment is standard split-phase type.

E. Shredding Mechanism:

A measure of the shredding effectiveness of this machine is the total number of cutting blades (17, 14, 12 and 19) that pass each other per unit time. In the present embodiment it is 5450 blade passings per second.

OPERATION

After the motor in housing 23 is started, leaves or other debris are sucked into the machine through the intake opening of guard 2, and caused to flow along the axis. First the stream of debris passes between the trailing edge of stationary blades 17b and the leading edge of low speed rotor blades 14b, where the first cutting occurs. The stream of debris then passes along in an axial direction until a second cutting occurs, between the trailing edges of the six slow moving blades 14b and the leading edge of the five high speed blades 12b, which move about five times faster. A third cutting occurs as the debris is moved axially to the plane in which it is caught between the trailing edges of high speed blades 12b and the fixed knife edges 19b of screen 19. The finely comminuted material then passes through the openings in screen 19 and connecting neck 4a, and is ultimately collected for disposal in bag 4.

It will be understood that the present invention is not limited to the specific structural forms disclosed herein by way of example, nor to the specific parameters or dimensions herein set forth to show the best mode of operation, but only as defined in the claims hereinafter. For example, electric motor 23 could be replaced by a gasoline engine. Although the present embodiment is designed for homeowner use, it will be understood that larger machines, employing the same principles, are ideal for commercial use.

What is claimed is:

1. A device for shredding garden debris which comprises in combination:

a housing frame having intake, exhaust and collecting means for said debris, a main shaft journalled for rotation in said housing frame, means comprising a motor for driving said main shaft to rotate about its principal axis, a first rotor fixed for rotation by said main shaft and having a plurality of cutting blades each shaped to include a leading edge and a trailing edge transversely disposed to the principal axis of said main shaft, a second rotor axially aligned ahead of said first rotor and having a plurality of cutting blades each shaped to include a leading edge and a trailing edge transversely disposed to the principal axis of said main shaft, said rotors being constructed and arranged to provide between them a substantial axial flow of air and debris from said intake to said exhaust means, the trailing edges of the blades of said second rotor being slightly spaced apart in an axial direction in cutting relation from the leading edges of the blades of said first rotor, gear reducing means connected to said main shaft and coupled to drive said second rotor at a rotational rate which is substantially less than the rotational rate of said first rotor.

2. The combination in accordance with claim 1 wherein said gear reducing means comprises an auxiliary shaft journalled for rotation on said main shaft, a ring gear having N teeth around its inner periphery and having a collar fastened to said auxiliary shaft, a pinion gear having less than N teeth around its external periphery of substantially smaller outer diameter than the internal diameter of said ring gear and disposed to move in meshed tooth relationship around the teeth of said ring gear, and planocentric means coupled to said pinion gear to prevent said pinion gear from rotating about its own axis as it transverses said ring gear.

3. The combination in accordance with claim 1 wherein the speed of rotation of said first rotor is approximately five times as great as the speed of rotation of said second rotor.

4. The combination in accordance with claim 1 wherein the clearances between the trailing edges of the blades of said second rotor and the leading edges of the blades of said first rotor do not exceed about one-tenth of an inch.

5. The combination in accordance with claim 1 whereby said housing has a substantially uniform internal cross-sectional area throughout the entire length thereof, including said intake and said exhaust means.

6. A device for shredding garden debris which comprises in combination:

a housing frame having intake and collecting means for said debris, a main shaft journalled for rotation in said housing frame, means comprises a motor for driving said main shaft to rotate about its principal axis, a first rotor fixed for rotation by said main shaft and having a plurality of blades each shaped to include a leading edge and a trailing edge transversely disposed to the principal axis of said main shaft, a second rotor axially aligned ahead of said first rotor and having a plurality of blades each shaped to include a leading edge and a trailing edge transversely disposed to the principal axis of said main shaft, the trailing edges of the blades of said second rotor being slightly spaced apart in an axial direction from the leading edges of the blades of said first rotor, gear reducing means connected to said main shaft and coupled to drive said second rotor at a rotational rate which is substantially less than the rotational rate of said first rotor, a hub comprising a plurality of radially extended stationary blades coaxial with said rotors and disposed in fixed relation to said housing frame in a position between said intake means and said second rotor, said stationary blades having their trailing edges transversely disposed to the principal axis of said main shaft and slightly spaced apart from the leading edges of the blades of said second rotor, and a screen coaxial with said rotors and disposed in fixed relation to said housing frame in a position between said collecting means and said first rotor, said screen comprising a plurality of openings each comprising a fixed blade having a leading edge transversely disposed to the principal axis of said main shaft, the leading edges of said screen blades slightly spaced apart from the trailing edges of the blades of said first rotor.

7. The combination in accordance with claim 2 wherein the clearances do not exceed about one-tenth of an inch between:

(a) the trailing edges of the blades of said hub comprising radially extended stationary blades and the leading edges of the blades of said second rotor;

(b) the trailing edges of the blades of said second rotor and the leading edges of the blades of said first rotor; and (c) the trailing edges of the blades of said first rotor and the leading edges of the blades fixed to the openings of said screen.

8. A device for shredding garden debris which comprises in combination:

a housing frame having intake and collecting means for said debris, a main shaft journalled for rotation in said housing frame, means comprising a motor for driving said main shaft to rotate about its principal axis, a first rotor fixed for rotation by said main shaft and having a plurality of blades each shaped to include a leading edge and a trailing edge transversely disposed to the principal axis of said main shaft, a second rotor axially aligned ahead of said first rotor and having a plurality of blades each shaped to include a leading edge and a trailing edge transversely disposed to the principal axis of said main shaft.

the trailing edges of the blades of said second rotor being slightly spaced apart in an axial direction from the leading edges of the blades of said first rotor, gear reducing means connected to said main shaft and coupled to drive said second rotor at a rotational rate which is substantially less than the rotational rate of said first rotor, wherein said gear reducing means comprises an auxiliary shaft journalled for rotation on said main shaft, a ring gear having N teeth around its inner periphery and having a collar fastened to said auxiliary shaft, a pinion gear having less than N teeth around its external periphery of substanially smaller outer diameter than the internal diameter of said ring gear and disposed to move in meshed tooth relationship around the teeth of said ring gear, planocentric means coupled to said pinion gear to prevent said pinion gear from rotating about its own axis as it traverses said ring gear, wherein said planocentric means comprises a spider having two pairs of radially disposed arms extended in rectangular relation from a central hub, each of which arms is longitudinally slotted, a fixed pair of lateral projections diametrically spaced apart connected to said pinion, said lateral projections being keyed for vertical motion in one pair of slots of said spider, a second pair of spaced-apart lateral projections fixed to said housing frame being keyed for horizontal motion in the other pair of slots of said spider permitting said spider to move to and fro in a horizontal direction, whereby when said pinion moves around the teeth of said ring gear, said first pair of projections move vertically in said first pair of slots, and said spider moves laterally relative to said second pair of projections.

* * * * *